Figure 1:
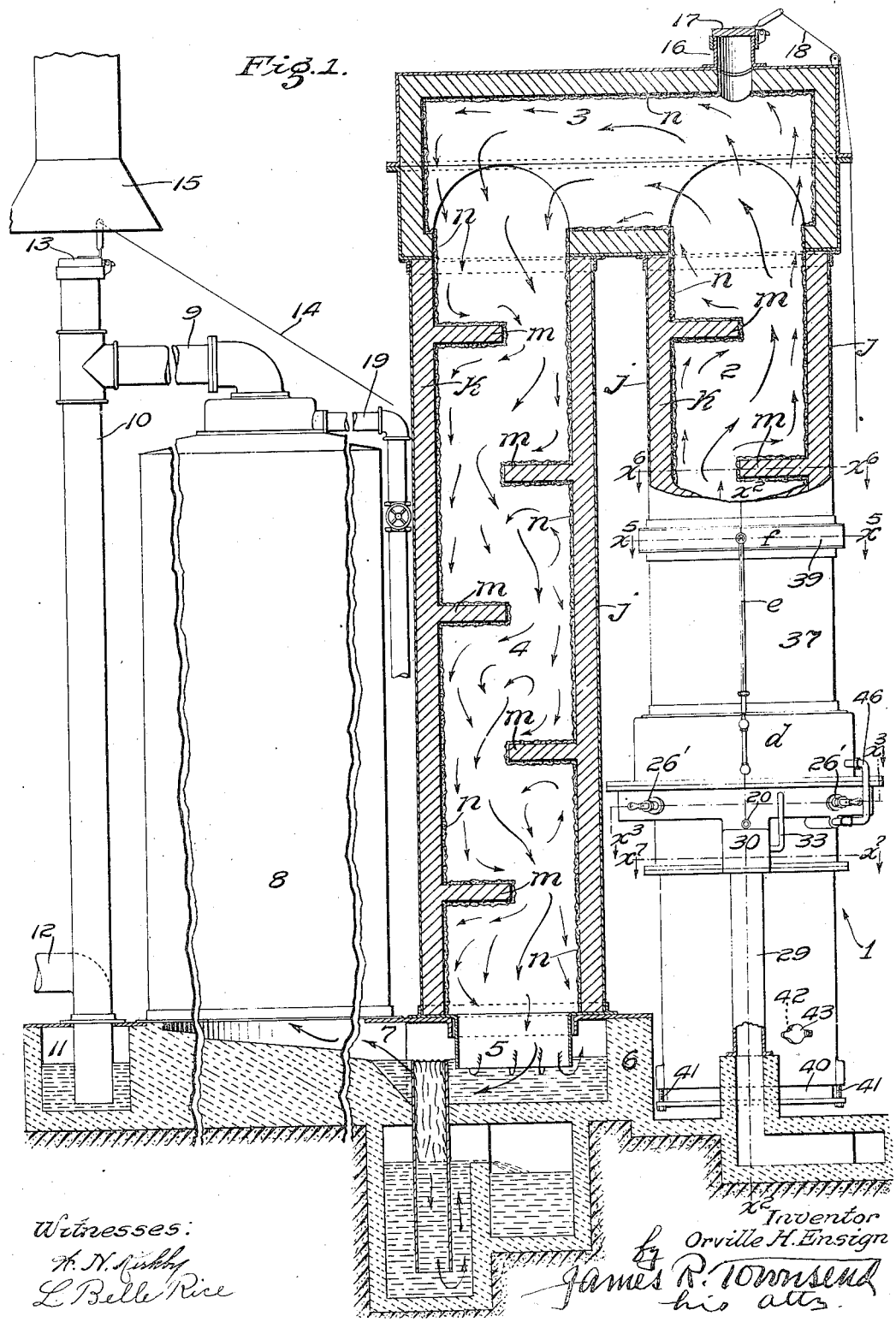

O. H. ENSIGN.
METHOD OF PRODUCING GAS.
APPLICATION FILED NOV. 23, 1909.

1,064,626.

Patented June 10, 1913.

4 SHEETS—SHEET 1.

Witnesses:
H. N. Kirkby
L. Belle Rice

Inventor
Orville H. Ensign
by James R. Townsend
his atty.

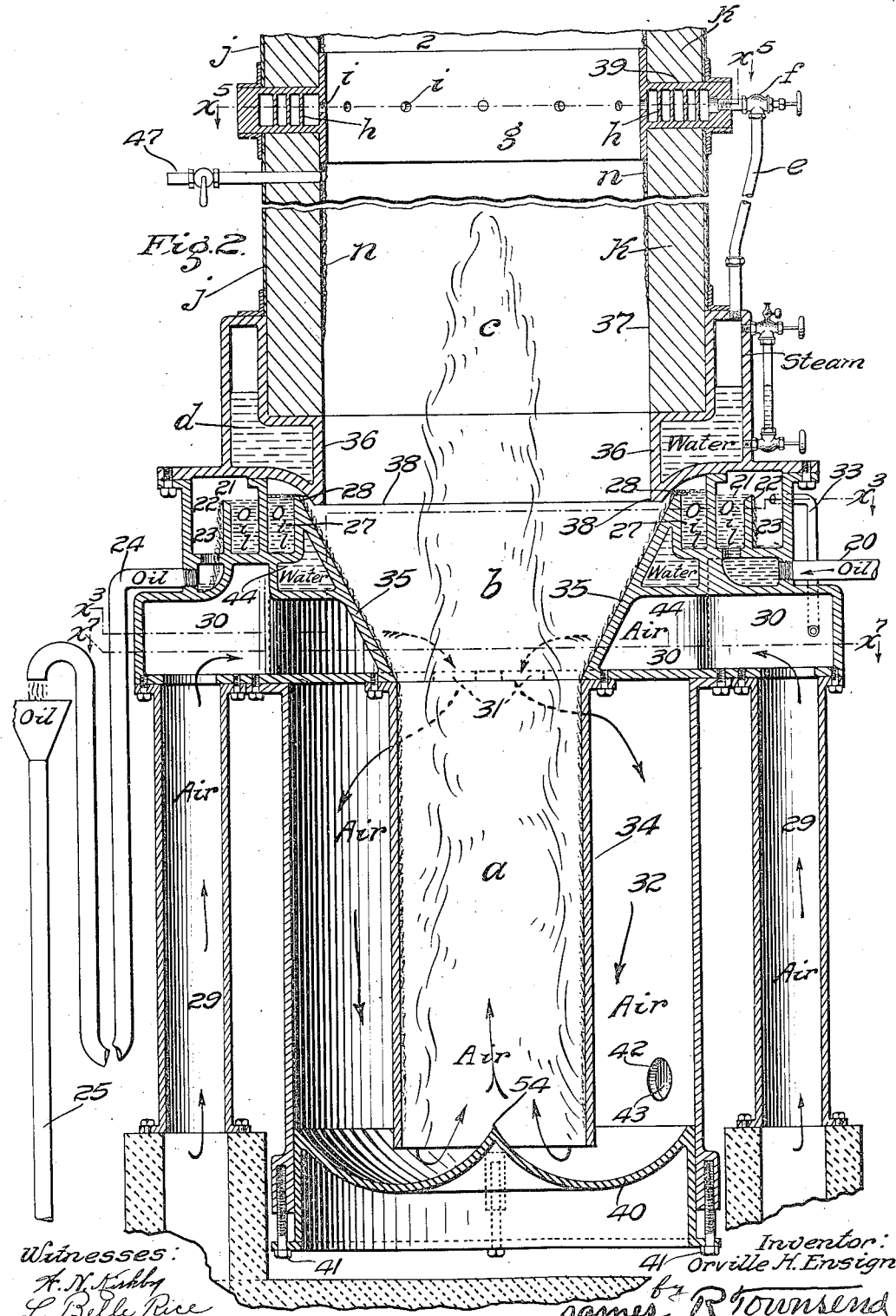

O. H. ENSIGN.
METHOD OF PRODUCING GAS.
APPLICATION FILED NOV. 29, 1909.
1,064,626.
Patented June 10, 1913.
4 SHEETS—SHEET 3.
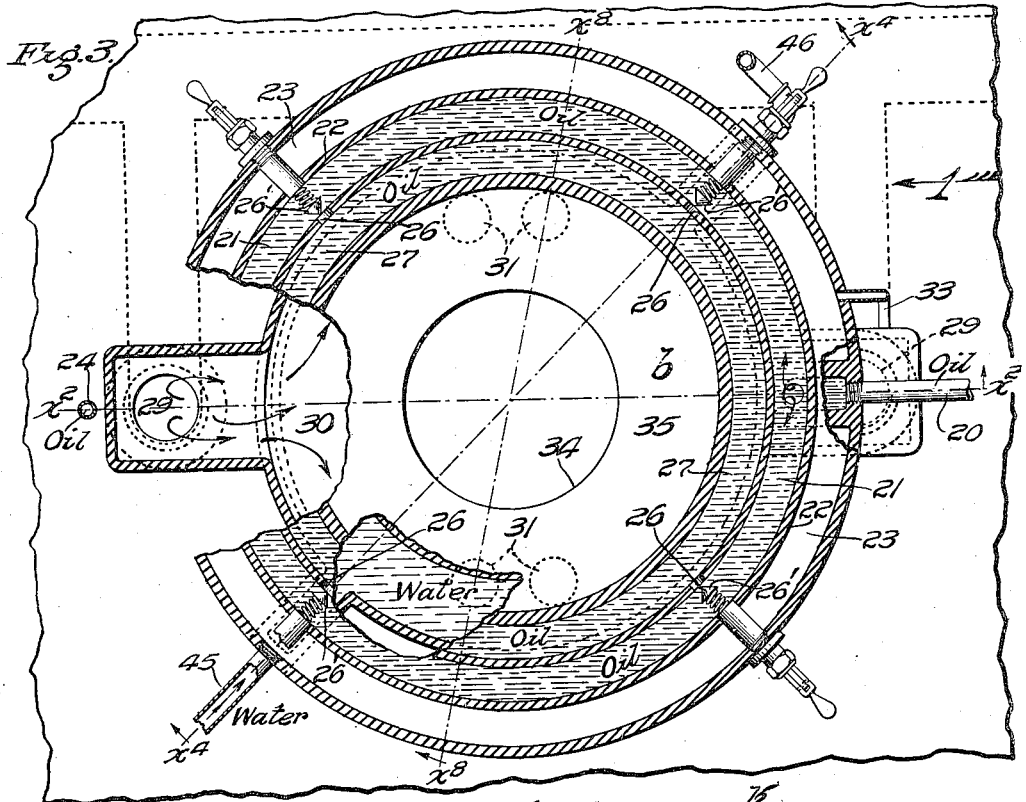
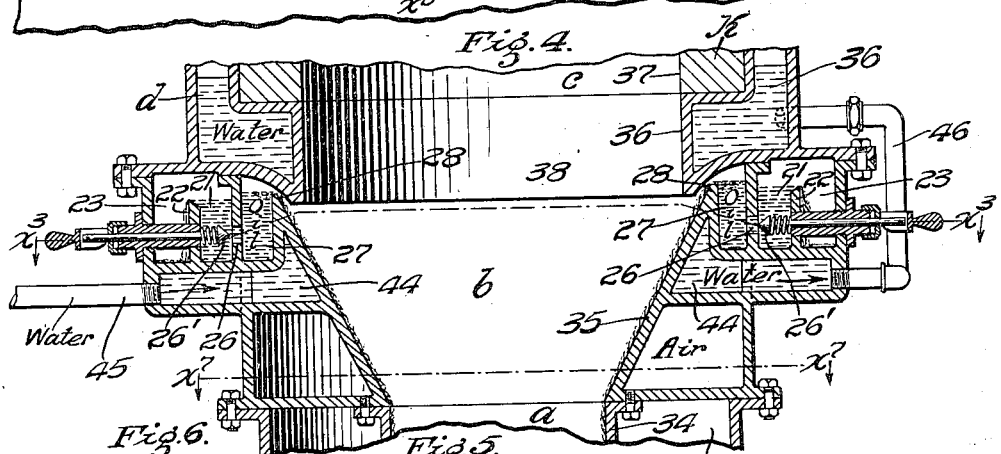
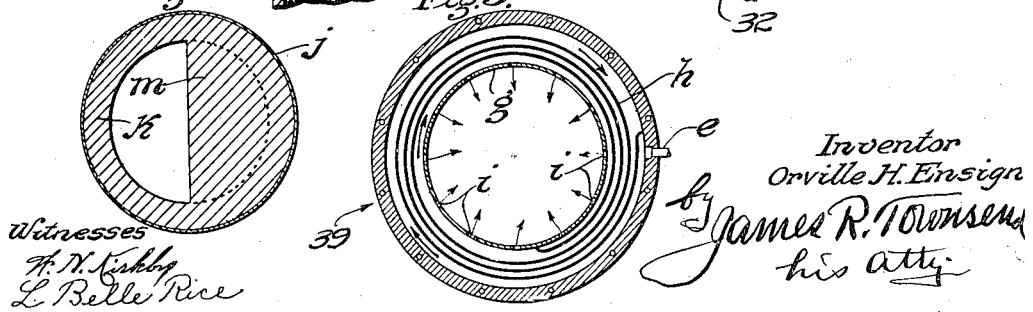
Witnesses
H. N. Kirkby
L. Belle Rice
Inventor
Orville H. Ensign
by James R. Townsend
his atty.

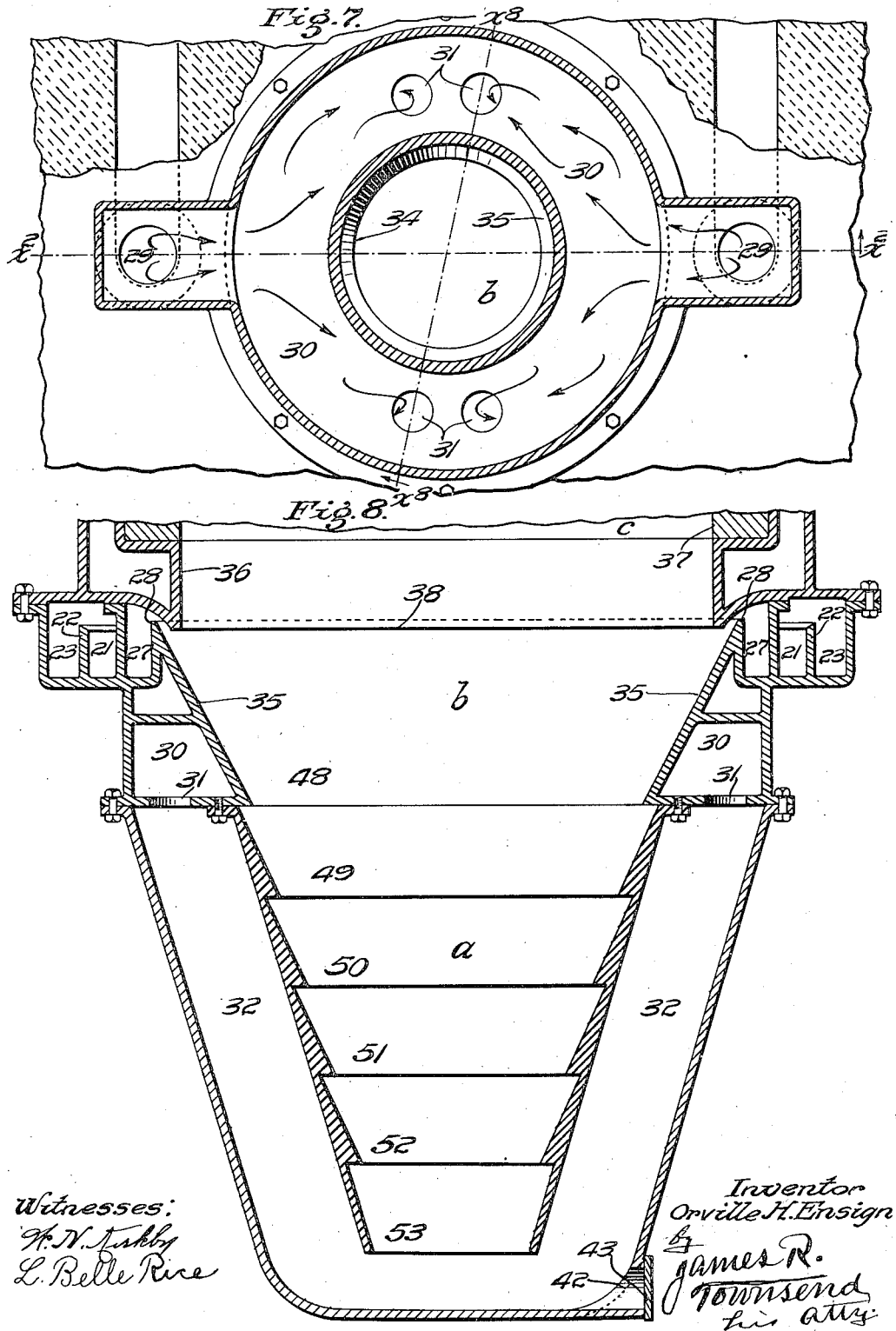

UNITED STATES PATENT OFFICE.

ORVILLE H. ENSIGN, OF LOS ANGELES, CALIFORNIA.

METHOD OF PRODUCING GAS.

1,064,626.

Specification of Letters Patent.

Patented June 10, 1913.

Application filed November 29, 1909. Serial No. 530,491.

*To all whom it may concern:*

Be it known that I, ORVILLE H. ENSIGN, a citizen of the United States, residing at Los Angeles, in the county of Los Angeles and State of California, have invented a new and useful Method of Producing Gas, of which the following is a specification.

This invention relates to the manufacture of producer gas from liquid hydrocarbons and includes a novel method whereby the fuel is acted upon with minimum liability of destructive breaking up and with minimum production of free hydrogen or free carbon in the final product.

In this new method, the breaking up of the crude fuel is accomplished by progressive distillation and the heavier constituents of the fuel are highly heated as the progressive distillation occurs, and are thus brought into a state suitable for combustion; but the heat applied to the different constituents of the fuel is directed to the fuel through the products of distillation from the fuel, thus avoiding the production of coke where the same might form an obstruction in the apparatus. The heat which is transmitted through the fuel is applied to raise the temperature to the air which supplies the oxygen for the fuel, and the air is introduced inside an envelop of the fuel and the products of distillation arising therefrom, and this process of making producer gas is a reversal of the ordinary processes of consuming gas as will hereinafter more fully appear.

The method may be carried out by various apparatuses, but the invention includes the apparatus herein set forth by which the method is most efficiently conducted.

An object of the invention is to make provision for the production of producer gas on a large scale with minimum investment, attendance, and consumption of fuel.

With relation to minimizing investment, the apparatus best adapted to the method is circular in form and upright in position thereby requiring only a minimum amount of material and a minimum amount of space; and provision is made whereby the liquid fuel operates as a protection for the structure against the intense heat at the zone of combustion. Therefore any requirement of brick lining in the combustion flue will be at a minimum, and such a lining may be unnecessary except in the combining apparatus. By this construction economy of space, material and repairs is effected.

Attendance is minimized by this method and this form of construction because but few units are needed to supply the total requirements of a practically unlimited demand. That is to say the producer can be economically built and operated in unusually large sizes. All the parts of the producer in which the principal actions take place are vertical; so that deposits along the walls, which would require close attention, are practically prevented, and such deposits as may occur are concentrated where they may be readily removed. The arrangement is also such that the deposits, if any occur, may be easily removed from the zone of combustion by currents of fresh air, that burn them off.

An object of the invention is to make provision whereby poor grades of oil may be successfully used with small attention.

With relation to low consumption of fuel an object is to maintain as far as possible the hydrogen fuel in combination with carbon as a gas. This is accomplished by causing the fuel to envelop the flame zone in direct contact with the flame, thereby forcing the hydrocarbons to be distilled before they reach the point of maximum temperature of the flame zone which point is removed from the vicinity of and from contact with the oxygen of the air, and thereby maintaining the lighter constituents practically free from combustion. This retaining of the hydrogen in combination with the carbon in gaseous form, minimizes the production of lamp-black, and loss in the operation of the process; thus bringing about the highest possible efficiency.

A feature of this invention resides in the employment of liquid fuel to intercept the heat of combustion and to direct such heat to distil, disassociate and recombine the combustible elements. In carrying on this process practically all of the heat of combustion of the fuel from which the gas is to be made will be conserved and employed in the production and combination of the gas and the radiating surfaces enveloping the highest temperatures are surrounded by an supplied to the producer, thus heat insulating the structure and restoring to fuel the heat which would tend otherwise to radiate and be lost in the surrounding air, aiding thereby the combustion of the heavier constituents and maintaining efficiency of the process.

In the manufacture of producer gas certain relations of the elements involved are to be maintained in order to secure the greatest economy and efficiency, that is to say, the air and fuel must be supplied in given proportions and the amount of heat applied to the work, the amount of combustion allowed to occur and the velocity of the air supply must bear appropriate relation to each other.

This invention is based on the principle that the production of gas for combustive purposes may be effected in the most economical and efficient manner by reversing the process of combustion of such gas in an open flame. In the latter process, the fuel is enveloped by an excess of oxygen and burns to the exhaustion of the fuel. In this gas-making process, the oxygen needed to produce the heat is enveloped by an excess of fuel and burns to the exhaustion of the oxygen instead of to the exhaustion of fuel.

In carrying out this invention, the placing of the apparatus for dissociation and developing of heat necessary in the process, with all of its passages and surfaces in a vertical position, allows the appropriate proportion of these surfaces to be arranged without producing angles in the flow of the vapors and gaseous products; and by lengthening the passages and lengthening the different portions of the passages and changing the diameters of various passages, various producers can be made without requiring any new structural features.

The invention may be understood by reference to the accompanying drawings.

Figure 1 is a fragmental elevation of a producer gas plant constructed in accordance with this invention. Portions of the combining passage are shown in vertical mid-section. The base of the apparatus is also sectioned and broken to show the air conduit, and the seal of the washer and the passages therefrom, and also the holder seal. Fig. 2 is a vertical axial section of the combustion chamber and the lower portion of the combining passage on line $x^2-x^2$, Figs. 1, 3 and 7 showing sections of the fuel feeding and regulating apparatus. The view is broken to economize space. Fig. 3 is a broken plan section on irregular line $x^3-x^3$, Figs. 1, 2 and 4. Fig. 4 is a vertical axial section on line $x^4-x^4$, Fig. 3. Fig. 5 is a plan section on line $x^5-x^5$, Figs. 1 and 2, to show the steam superheater. Fig. 6 is a plan section on line $x^6-x^6$, Fig. 1, showing the form of baffles used. Fig. 7 is a plan section on line $x^7-x^7$, Figs. 1, 2 and 4, showing air passages in the producer. Fig. 8 is a vertical axial section showing another form of combustion chamber. The section is taken on a line corresponding to that indicated by $x^8-x^8$, Figs. 3 and 7.

The producer is composed of two portions having distinct functions, viz: one portion in which are developed the initial stages of the process that consist of production of heat by partial combustion and the progressive dissociation of the fuel into hydrocarbon compounds by such heat, and another portion in which is performed the function of holding these dissociated compounds and the products of partial combustion at as high a temperature as possible to be obtained from the heat produced, and allowing them to be mingled together and constantly stirred, thus to cause them to combine in fixed inflammable gas. The dissociating portion of this producer extends from the base of the structure to a point above the level of the oil supply, from whence the combining and fixing members of the producer extend on to the seal.

The character 1 designates in a general way the dissociating apparatus, and 2, 3 and 4 designate three members of the combining and fixing apparatus.

5 designates the seal in the base 6 of the apparatus, which base is provided with an open passage-way 7 leading from the seal to the washer 8, that may be of any desired construction and discharges at the top through the horizontal gas pipe 9 into a vertical gas pipe 10 which passes at its bottom into a holder seal 11 from which the holder main 12 leads to a holder, not shown. The upper end of the pipe 10 is provided with a stack valve 13, controlled in the usual way by a connection 14, and discharges into a smoke-stack 15. The combining and fixing apparatus is also provided with a stack 16 and stack valve 17, operated by the connection 18, and discharges into the open air or into a smoke-stack, not shown.

19 is a valved pipe to supply water to the washer 8.

The fuel is supplied to the apparatus through the supply pipe 20 from which it flows into the first oil receptacle 21 having an overflow weir 22 in an inclosed air pressure space 23 having a sealed overflow pipe 24 that discharges into the return oil pipe 25 through which the overflow oil may be returned to the storage tank, not shown, from which it is pumped by a pump, not shown, to the pipe 20. The oil flows from the first oil receptacle 21 through an orifice 26 controlled by a regulating needle-valve 26′ into the second oil receptacle 27 from whence it may be forced by the air pressure in space 23 over the level annular rim 28 of said receptacle and thereby be evenly distributed around the periphery of the upper portion of the surface prepared to receive the oil inside the dissociating or combustion flue. The dissociating flue $a$, $b$, $c$, is open throughout from bottom to top and the fuel is supplied evenly thereto over the level annular edge 28 which is also the upper edge of the fuel inlet member of said flue, and the air to be used in the process of disassociating constituents of the fuel is supplied to the open lower end of the flue. The flow of the fuel is regulated relative to the flow of the air by suitable means not shown in this application; and the oil flowing over the annular edge 28 into the dissociating flue will flow down the interior wall uniformly in a film or hollow stream that extends all around the flue space.

The air is supplied to the producer from a common source as a blower, not shown, and flows through one or more pipes 29, an air-chest 30 and a resistance device 31, into the air trunk 32 which surrounds and discharges into the lower end of the dissociating flue $a$, $b$, $c$. The air-chest 30 and the inclosed space 23 are connected through a pipe 33 so that the pressure of air on the oil in the first oil receptacle 21 corresponds to the air pressure in the air-chest 30, and may force the oil over the edge 28.

The dissociating flue $a$, $b$, $c$, is preferably circular in cross-section and may be formed of a lower cylindrical section 34, an intermediate funnel-shaped fuel-receiving section 35, a boiler section 36, and an upper section 37 that merges into and serves to initiate the functions of the combining apparatus.

The upper portion 37, of the dissociating apparatus is a heat retaining tube mounted directly above the fuel receiving section 35. The boiler section 36 is an iron casting with a chamber $d$ and constitutes a steam generator which terminates at its inner lower portion in a depending lip 38 which extends down below the level of the upper annular edge or rim 28 of the fuel receiving section 35, to protect said edge from high temperatures and to prevent solid material from forming on or falling onto said edge, thus avoiding formation of any obstruction to the uniform flow of the oil.

The steam generator 36 is arranged to absorb and carry away heat which might be destructive to the lip 38, and to produce steam for enriching gas. The steam is led through a pipe $e$ having a valve $f$ to a super-heater 39 which is a hollow castiron annulus having a large heat absorbing collar $g$ inside the flue, at the upper end of the section 37 and is heated by the heat of the products passing through the flue. In order to increase the transmission of heat to the steam from the collar $g$ the super-heater is provided with a spiral partition $h$ so that the steam passes through a sinuous way to reach the orifices $i$ in the collar $g$ through which the steam is emitted from the super-heater into the lower end 2 of the combining flue.

The walls of sections 37, 2, 3 and 4, may be constructed with an outer iron shell $j$ and an inner lining $k$ of fire brick or other heat-resisting material.

The bottom of the air trunk 32 is closed by a head 40, supported by means of bolts 41 and thereby made vertically adjustable with the object of adjusting the opening around the lower edge of the dissociating flue 34 so that the velocity of air will be sufficient at the lowest capacity for which the producer may be used, to carry into the stream of upwardly moving air any drops of fuel which may reach the bottom of the dissociating flue.

The fuel-receiving portion 35 of the dissociating flue is arranged in the form of a funnel or hollow inverted cone, for the purpose of removing its surface out of the line of direct action of the flame produced by combustion in the lower portion of the flue, for these reasons, viz: As the oil enters the producer over the edge 28 it becomes exposed to the heat of the flame of the combustion which is extending upward from the lower cylindrical portion of the flue, and the freshly-supplied oil on the cone-shaped surface 35 immediately begins to distil and its constituents separate in the order of their volatile qualities; the lighter distillates at the top, the heavier distillates nearer the bottom of the cone, and down a part of the way into the cylindrical portion of the flue. The heavy constituents like asphaltum or tar, in a highly heated and fluid state, continue to flow down the circular walls of the tube to or near to the bottom of the same, and will meet the incoming air. Initial ignition of the oil is accomplished by inserting a torch through the lighting hole 42 when the oil is first allowed to flow. Said hole is normally closed by a cover 43. As the process proceeds combustion will take place at or near the bottom of the flue. The flame will be supplied partly by fuel blown off the lower edge and partly by the fuel in contact with the walls in the lower portion of the flue. As it ascends, the flame of the burning fuel will be confined to the center by the distilled vapors which are passing off from the side. These vapors will flow on with the red-hot products of the combustion into the combining apparatus above, and mingling with these products will be broken up into the nearest hydrocarbon compound, which is a gas. The air as it enters the apparatus through the air chest 30 flows part way around the intermediate portion 35 of the dissociating flue, so as to keep the temperature of this portion from becoming too hot. The object in view is to have the oil gradually subjected to a higher temperature as it flows down the walls of the dissociating flue. The air then passes through the resistance 31 and in contact with the lower portion 34 of the flue is still further heated so that this heat is all conserved and the air enters the combustion portion of the flue highly heated, and hence is there capable of causing the combustion of the asphaltum which only is used to burn, and thus furnish the heat for the operation of the apparatus. Thus it may be seen that distinctive features of this invention are, that the fuel flows in a complete envelop around the flame which is developing the heat for carrying on the process. The air is around the outside of the fuel tending to keep the surfaces over which the fuel flows, at moderate temperatures compared with the flame of combustion, and thus keeping the undistilled fuel in a liquid form as long as possible, and at the same time causing the fuel to intercept all the heat of combustion in its attempt to radiate outwardly, and to finally intercept what heat has radiated through the walls of the combustion flue by the freshly supplied air; such heat being again returned to the combustion flue and thereby minimizing the loss which would occur in other processes. To further insure the gradual or progressive heating of the fuel through the progressive distillation of the same, the fuel-receiving portion 35 of the flue is further cooled by an annular water circulating passage 44 located near the upper portion of the cone. Said water circulating passage 44 is supplied with cold water through a water pipe 45 at one side of the apparatus and discharges at the other side of the apparatus through a conducting pipe 46 into the steam generator 36. This steam generator will furnish steam at not more than three or four pounds pressure, thus limiting the maximum temperatures of the steam generator to 220 degrees Fahrenheit and the upper portion of the cone 35 to not more than 180 degrees Fahrenheit.

The essential features to be borne in mind are, that the oil does not at any time receive from the surface over which it flows the heat necessary to distil any individual grade of distillates except those most volatile; but the distillation is produced by radiant heat from the combustion occurring in front of it; and that the fuel is the medium for transmission of heat to the surface upon which it flows and the combustion flue will gradually get hotter and hotter toward the bottom until some point near the bottom reaches a maximum temperature.

The principal object of this is: First, to bring about an operation which will be approximately continuous by preventing the formation of solid carbon on the distilling surface. If these walls were the medium of transmission of heat to the fuel, sooner or later, hard coke would form on these surfaces and the operation would be interfered with. Second, if the oil upon entering the combustion flue is delivered onto a highly heated surface, distillation will take place so rapidly that it will take the nature of an explosion, and the vapors will be projected violently into the passing flame so that unconsumed oxygen in the body of the flue will attack the vapors and cause explosive action. This is the reason for the annular water circulating space 44 which is designed to keep the temperature down to a point at which violent distillation cannot occur so that the progressive distillation of the lighter toward the heavier constituents occurs gradually downward regardless of the high temperatures in the center of the flue. Actual operation has shown that if the cooling water is omitted in the space 44 the apparatus takes on a violent vibration produced by a series of rapid explosions. The result is shown at the tell-tale 47 which may project from the upper flue section 37, and when the same is open, the gas issues in a series of puffs and an attempt to light the gas at this point with a torch will result in a series of flames, one following the other, and plainly indicating that each explosion is the effect of consuming a portion of the valuable heat-producing constituents of the gas; resulting in a general lowering of the heating value of the gas finally produced. Said tell-tale may be located at any point convenient for observation underneath the superheater, and preferably close to the top of the dissociating section of the apparatus. If the tell-tale is opened without lighting, the gas will issue from the tell-tale in puffs alternately brown and clear, the brown puffs being combustible and the clear puffs being non-combustible, thus indicating the intermittent occurrence of approximately complete combustion inside. Third, as the oil flows down in a tubular stream surrounding the flame zone and loses its distillates, the heaviest constituent thereof, as asphaltum in the case of asphaltic oils, is by this means made to approach the point of entry of the air in a highly heated condition, which is necessary for combustion of this material which is exceedingly difficult to burn with any degree of satisfaction. Thus it is made possible to separate the asphaltum or other heavy bases which cannot be further distilled, and to use them for fuel to furnish the heat for carrying on the process.

A principle of this invention is that it more surely limits the combustion to a partial combustion. This is accomplished by the method of mingling the fuel and the air. The fuel which is carried off the bottom of the cylindrical flue is discharged into the stream of air across the direction of its movement and from all sides uniformly, thus tending to fill the current of upwardly tending air completely with filaments and globules of fuel, producing that condition of excess fuel mingled with the air, necessary to limit the combustion largely to the point of producing carbon monoxid (CO) rather than carbon dioxid ($CO_2$).

In Fig. 8 the form of combustion flue shown is designed to graphically illustrate the method of accelerating the air by contraction at the bottom of the flue; and the number of conical surfaces 48, 49, 50, 51, 52, 53, inside the flue expose the heavier constituents in order of their weight, directly to the action of the air as it expands.

The bottom 40 of the air-trunk may terminate in a central conical tip 54 to assist in directing the air upward through the open bottom of the dissociating tube.

The combining flue 2, 3, 4, is provided internally with baffles $m$ which may extend half way, more or less, across said flue, thus forming a sinuous passage the walls and baffles of which will become highly heated by the hot products from the dissociating flue as the same pass on their way to the washer. From such products there will be formed along the walls and on the baffles of the flue, deposits $n$ in the form of lamp-black in an incandescent state; and portions of such deposits will be taken up by the hot products as they impinge on the surfaces of the walls and baffles. Such surfaces are angularly arranged as shown so that the products passing through the flue are constantly impinging thereon and thereby mixed and stirred so as to intimately mingle all the constituents of the products and bring them into contact with each other and with the free carbon for the purpose of completing the fixed inflammable gas; and the steam injected into the products flowing from the dissociating flue will be carried thereby and intimately mixed therewith, and coming into contact with the carbon in the presence of the heated products, will be decomposed into its component elements of oxygen and hydrogen both of which will contact with the carbon on the walls of the combining apparatus and, combining with such carbon will tend to limit the depth of such deposit. This carbon deposit is further limited in depth by combination with carbon dioxid ($CO_2$) which may be formed in very small quantities in the flame zone, and which, upon coming in contact with this deposit, will produce carbon monoxid (CO), an inflammable gas.

Among the decompositions and recombinations which may occur are the following:

$$CO_2 + C = 2CO$$
$$H_2O = 2H + O$$

from which we may have $$O + C = CO$$

or $$O_2 + C = CO_2$$

which farther along becomes $$CO_2 + C = CO,$$

also $H + C$ may become $CH_4$ and $C_2H_4$. These two latter gases represent the greater part of the heating value and are undoubtedly formed by this means and from the selective breaking up of the distilled vapor; the latter recombination producing the larger quantity.

This system is most advantageously operated with the interior of the apparatus at a higher pressure than the atmosphere. This pressure is caused by the back pressure from the holder, the resistance through the seals of the apparatus and the resistance to the flow of the gas through the washing apparatus and the combining apparatus. The pressure is produced by a suitable blower and may be maintained at any desired amount found advantageous.

I claim:—

1. The process of making producer gas from hydro-carbon fuel which consists in causing the separation of such fuel by gravity and distillation simultaneously into heavier and lighter portions, causing partial combustion of a separated heavier portion and applying the heat of such combustion directly to the fuel in the process of such separation, and progressively dissociating the fuel by the heat of the combustion of such heavier portion and thereby forming hydro-carbon gaseous compounds, meanwhile maintaining the gaseous products from the lighter portions practically free from combustion.

2. The process of making producer gas from hydro-carbon fuel which consists in causing the separation of such fuel by gravity and distillation simultaneously into heavier and lighter portions, causing partial combustion of a separated heavier portion and applying the heat of such combustion directly to the fuel in the process of such separation, and progressively dissociating the fuel by the heat of the combustion of such heavier portion and thereby forming hydro-carbon gaseous compounds, and holding these dissociated compounds and the products of partial combustion at a high temperature, meanwhile maintaining the gaseous products from the lighter portions practically free from combustion.

3. The process of making producer gas from hydro-carbon fuel which consists in causing the separation of such fuel by gravity and distillation simultaneously into heavier and lighter portions, causing partial combustion of a separated heavier portion and applying the heat of such combustion directly to the fuel in the process of such separation, and progressively dissociating the fuel by the heat of the combustion of such heavier portion and thereby forming hydro-carbon gaseous compounds, and holding these dissociated compounds at a high temperature obtained from the heat thus produced, meanwhile maintaining the gaseous products from the lighter portions practically free from combustion.

4. The process of making producer gas from hydro-carbon fuel which consists in causing the separation of such fuel by gravity and distillation simultaneously into heavier and lighter portions, causing partial combustion of a separated heavier portion and applying the heat of such combustion directly to the fuel in the process of such separation, and progressively dissociating the fuel by the heat of the combustion of such heavier portion and thereby forming hyro-carbon gaseous compounds, meanwhile maintaining the gaseous products from the lighter portions practically free from combustion and stirring and mixing the products while heated.

5. In the production of producer gas, the step set forth which consists in breaking up crude hydro-carbon fuel by progressive distillation and gravity within a combustion chamber; meanwhile maintaining the gaseous products of the lighter constituents practically free from combustion.

6. In the production of producer gas, the method set forth which consists in breaking up crude fuel by progressive distillation and separated by gravity, mingling the resultant distillates with the incandescent products of combustion, meanwhile maintaining the distillates from the lighter material practically free from combustion and causing said distillates and products to combine, thus making a fixed, inflammable gas.

7. In the production of gas from hydrocarbon fuel, the method of maintaining hydrogen in combination with carbon as a gas which consists in causing the fuel to envelop a flame zone in direct contact with the flame which supplies the heat for dissociating fuel to produce the gas.

8. In the production of gas from hydrocarbon fuel, the method of maintaining hydrogen in combination with carbon as a gas which consists in causing the fuel to envelop a flame zone in direct contact with the flame which supplies the heat for dissociating fuel, thereby causing the lighter hydrocarbons to be distilled into vapor mingled with the products of the combustion zone, and holding the products at a high temperature away from the presence of free oxygen, thus causing a change in the relation between the hydrogen and carbon of these distillates so that the resultant product is fixed gas consisting largely of hydrocarbon compounds.

9. The method of making gas which consists in enveloping the oxygen in a combustion zone in direct contact with the flame thereof and enveloping the combustion zone in hydrocarbon fuel and exhausting the oxygen by an excess of such fuel.

10. The method set forth of making producer gas which consists in causing air to flow into an envelop of fluid fuel, maintaining partial combustion of the fuel, maintaining flow of the fuel, allowing the products to expand and subjecting the same to the action of the heat evolved by such partial combustion.

11. The method set forth of making producer gas which consists in supplying a column of air to the interior of a cylindrical column of fluid fuel, maintaining combustion of the fuel inside the column, allowing expansion of the resultant product and subjecting such expanded product to the action of the heat evolved.

12. The method of producing gas set forth, which consists in causing liquid hydrocarbon to flow downward in a hollow stream, supplying air and causing ignition of fuel inside the lower end of such stream, and thereby causing distillation to occur progressively from the inner surface of such stream, in volume sufficient to more than satisfy the oxygen of the supplied air, carrying off the products and fixing the same.

13. In the production of producer gas, the method set forth which consists in breaking up crude fuel by progressive distillation, mingling the resultant distillates with incandescent products of combustion, and causing said distillates and products to combine in the presence of super-heated steam.

14. In the production of gas from hydrocarbon fuel, the method of maintaining hydrogen in combination with carbon as a gas which consists in causing the fuel to envelop a flame zone in direct contact with the flame which supplies the heat for dissociating fuel, thereby causing the lighter hydrocarbons to be distilled into vapor mingled with products of the combustion zone, and holding the products at a high temperature away from the presence of free oxygen and in the presence of super-heated steam, and thereby maintaining the lighter constituents practically free from combustion.

15. In the production of gas from hydrocarbon fuel, the method of maintaining hydrogen in combination with carbon as a gas which consists in causing the fuel to envelop a flame zone in direct contact with the flame which supplies the heat for dissociating fuel, thereby causing the lighter hydrocarbons to be distilled into vapor mingled with the products of the combustion zone, and holding the products at a high temperature away from the presence of free oxygen and in the presence of super-heated steam and incandescent carbon.

16. The method set forth of making producer gas which consists in causing air to flow into an envelop of fluid fuel, maintaining partial combustion of the fuel, maintaining flow of the fuel, allowing the products to expand and subjecting the same, in the presence of super-heated steam, to the action of the heat evolved by such partial combustion.

17. The method set forth of making producer gas which consists in causing air to flow into an envelop of fluid fuel, maintaining partial combustion of the fuel, maintaining flow of the fuel, allowing the products to expand and subjecting the same, in the presence of super-heated steam, and incandescent carbon, to the action of the heat evolved by such partial combustion.

In testimony whereof, I have hereunto set my hand at Los Angeles, California, this 24th day of November, 1909.

ORVILLE H. ENSIGN.

In presence of—
 JAMES R. TOWNSEND,
 L. BELLE RICE.